United States Patent [19]

Wössner

[11] 4,003,454

[45] Jan. 18, 1977

[54] SHOCK ABSORBER

[75] Inventor: Felix Wössner, Schweinfurt am Main, Germany

[73] Assignee: Fichtel & Sachs A.G., Schweinfurt am Main, Germany

[22] Filed: Apr. 30, 1975

[21] Appl. No.: 573,330

[30] Foreign Application Priority Data

May 9, 1974 Germany .................... 2422479

[52] U.S. Cl. .................... 188/322; 293/85
[51] Int. Cl.² .................... B60R 19/06
[58] Field of Search .................... 293/70, 85, 86; 188/1 C, 322; 267/116, 139; 213/43

[56] References Cited

UNITED STATES PATENTS

| 3,489,087 | 1/1970 | Soderberg | 188/1 C X |
| 3,596,774 | 8/1971 | Mac Curdy | 213/43 X |
| 3,804,443 | 4/1974 | Komatsu | 293/70 |

Primary Examiner—Robert B. Reeves
Assistant Examiner—John P. Shannon
Attorney, Agent, or Firm—Hans Berman

[57] ABSTRACT

An impact shock absorber is mounted between the bumper and body of a motor car and permits the bumper to move relative to the car body when the bumper hits an obstacle. The shock absorber damps the impact energy during this relative movement. It consists essentially of a cylinder wherein a piston is glidingly mounted and held under a yielding force in a rest position. The piston is weakened at its connection to the inner end of the piston rod that the piston will break off the rod under a selected maximum impact force.

5 Claims, 5 Drawing Figures

SHOCK ABSORBER

The present invention relates to improvements in shock absorbers, and more particularly shock absorbers mounted between a motor car body and a bumper.

Impact shock absorbers of this type comprise a cylinder part and a piston part, one of the shock absorber parts being connected to a body element and the other shock absorber part being connected to an impact absorbing element. The shock absorber mounts the impact absorbing element on the body element for relative movement in respect thereto under an impact acting on the impact absorbing element. The piston part is glidingly mounted on the cylinder part and is held under a yielding force, such as a fluid, in a rest position. Impact causes the piston part to glide in the cylinder part against the yielding force to provide shock absorption.

Known impact shock absorbers of this type, whose effectiveness is dependent on the velocity of the body element and the corresponding impact force on the impact absorbing element, are constructed so as to respond to a predetermined velocity range. Their purpose is to absorb the impact on the body element moving at a moderate speed so that damage to the body element and any riders inside thereof is minimized or entirely avoided. Usually, such shock absorbers are calibrated for impacts at a speed of about 8 km/h.

When such a shock absorber is subjected to high speed impacts, i.e. those exceeding the norm of the absorber, it operates as a substantially rigid unit, i.e. it does not yield. Under such excessive impact, the entire rigid absorber unit is simply pressed into the car body and damages it. Thus, motor cars equipped with such shock absorbers may show larger steering wheel displacement under high speed impacts than cars without such bumper shock absorbers.

It is the primary object of this invention to provide an impact shock absorber of the indicated type which avoids this disadvantage and which is so constructed that the piston rod will move into the cylinder of the absorber even under high speed impact.

This and other objects are accomplished in accordance with the invention by weakening one of the shock absorber parts so that it breaks under a selected maximum impact force. In this manner, the damping force of the absorber is considerably reduced at high speeds even when the selected maximum impact force for which the absorber has been calibrated is exceeded.

In the embodiments illustrated herein, the inner end of a piston rod carries the piston part and an outer end of the piston rod extends outside the cylinder part and is connected to the body or impact absorbing element. The piston part is weakened at the connection between the inner piston rod end and the piston part to break at the connection. Under excessive impact, the piston rod will then be free to move into the cylinder part, with the piston part being disconnected from the piston rod. Where the weakened connection is formed by a flange on the piston part, the axial length of the flange will determine the maximum impact force absorbed.

The above and other objects, advantages and features of the present invention will become more apparent from the following detailed description of certain now preferred embodiments thereof, taken in conjunction with the accompanying drawing wherein.

Figure 1:
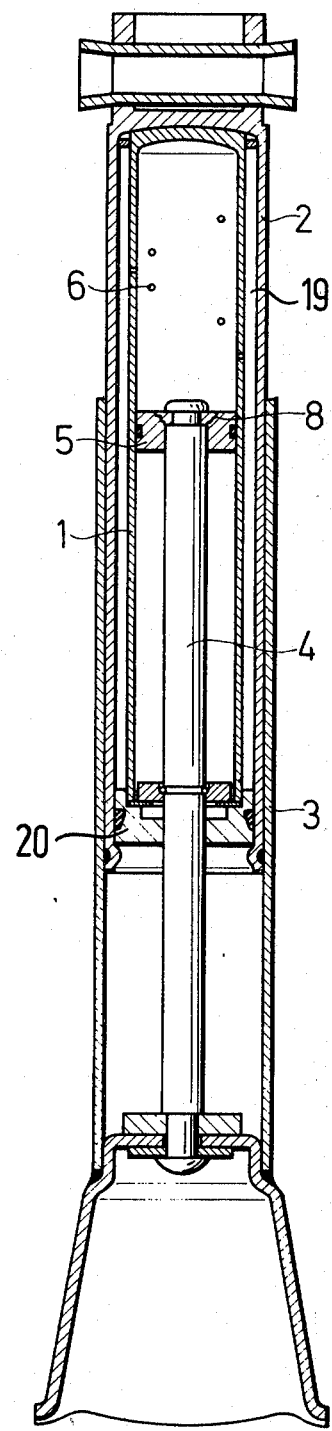
FIG. 1 shows a longitudinal section of one embodiment of the shock absorber of this invention.

Referring now to the drawing wherein like reference numerals designate like parts functioning in a like manner in all figures, the illustrated shock absorber consists essentially of a cylinder part and a piston part, the end of one of the shock absorber parts being connected to the body of a car while the end of the other shock absorber part is connected to the bumper of the car. Two such shock absorbers mount the bumper on the car body. The shock absorbers are designed to absorb impact velocities of up to about 8 km/h and thus to prevent damage to the car body. However, impacts at higher speeds cannot be absorbed by the shock absorber and will cause damage to the shock absorbers and to the car body.

Figure 2:
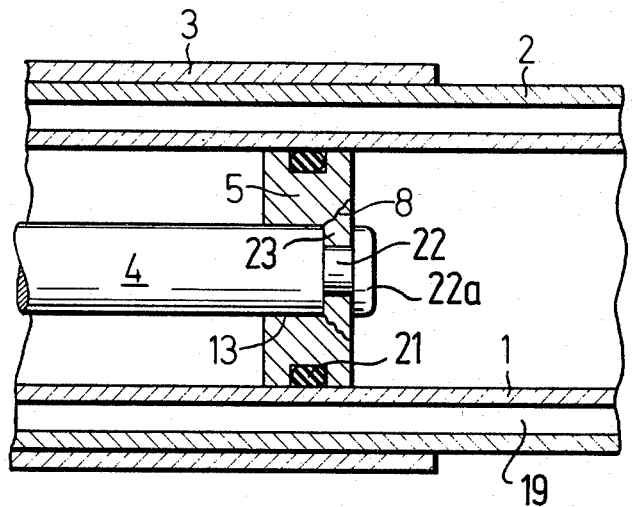
FIG. 2 is a like but enlarged sectional view of a detail of the embodiment of FIG. 1.

Referring now to FIGS. 1 and 2, the shock absorber is shown in consist essentially of cylinder 1 glidingly housing piston 5 connected to piston rod 4. The outer end of the piston rod, which extends outside cylinder 1, is affixed to the car body, for instance by riveting. Cylinder 1 is coaxially encased in absorber housing 2 defining annular chamber 19 therebetween, one end wall of cylinder 1 being welded to an end wall of housing 2 while closure member 20 is welded to the other end of housing 2 and has a shoulder receiving the other end of cylinder 1. Piston rod 4 passes through a central bore in closure member 20. Piston 5 divides the interior of cylinder 1 into two cylinder chambers, one of the cylinder chambers being in communication with annular chamber 19 through a plurality of weep holes 6 in the wall of cylinder 1, thus connecting the high pressure chamber in cylinder 1 to chamber 19 and providing a damping or impact absorbing effect. The end wall of housing 2 is affixed to the bumper. Protective and guide tube 3 concentrically surrounds shock absorber housing 2, the guide tube being affixed to the car body and holding the shock absorber. Rubber or like o-ring 21 holds piston 5 in fluid-tight engagement with the inner wall of shock absorber cylinder 1 when the piston glides therealong.

In accordance with this invention, the inner end of piston rod 4 has coaxial projection 22 of a reduced diameter, this neck defining a shoulder with the rod. The piston defines a conformingly stepped central bore 13 whereinto the end of piston rod 4 and its neck 22 fit. Piston 5 is mounted by pressing the piston rod end through its central bore 13, whereupon neck 22 is flattened to provide head 22a, which rivets the piston to the piston rod in the manner well illustrated in FIG. 2. Radially inwardly directed annular flange 23 is formed at the connection between piston rod 4 and piston 5, the axial length of piston flange 23 being so selected that the piston will break along line 8 when the impact force acting upon the piston exceeds a maximum limit. This will cause the piston to be disconnected from the piston rod and the shock absorber to become ineffective.

Figure 3:
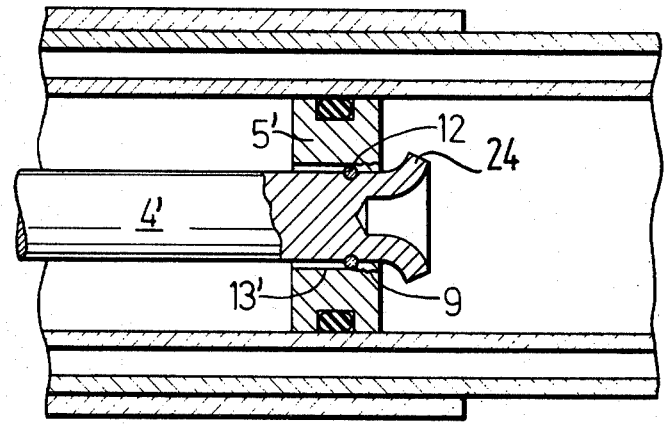
FIG. 3 is a view similar to that of FIG. 2 but showing another embodiment.

In the modified piston-piston rod connection of FIG. 3, an annular circumferential groove near the end of piston rod 4' holds snap ring 12, and piston 5' with its stepped central bore 13' is mounted on the piston rod end by sliding the piston ring into engagement with the snap ring. As in the embodiment of FIGS. 1 and 2, a radially inwardly directed annular flange is again formed and the piston will break along line 9 connecting the flange to the rest of the piston when the impact force acting on the piston exceeds a predetermined maximum limit depending on the axial length of the annular flange.

In this embodiment, the inner end of piston rod 4 has an annular collar 24 which is bent over after the piston has been mounted on the piston rod so as to hold the piston on the rod between snap ring 12 and the bent-over collar.

In shock absorbers of the above-described type, the piston of the absorber will be disconnected from the piston rod under an impact caused by relatively high velocities. This will reduce the damping force of the shock absorber in the ratio of the surface areas of the piston and piston rod facing the high pressure cylinder chamber. Thus, at such velocities, the impact absorption changes considerably. This "give" of the absorbers is particularly important at high velocities.

Figure 4:
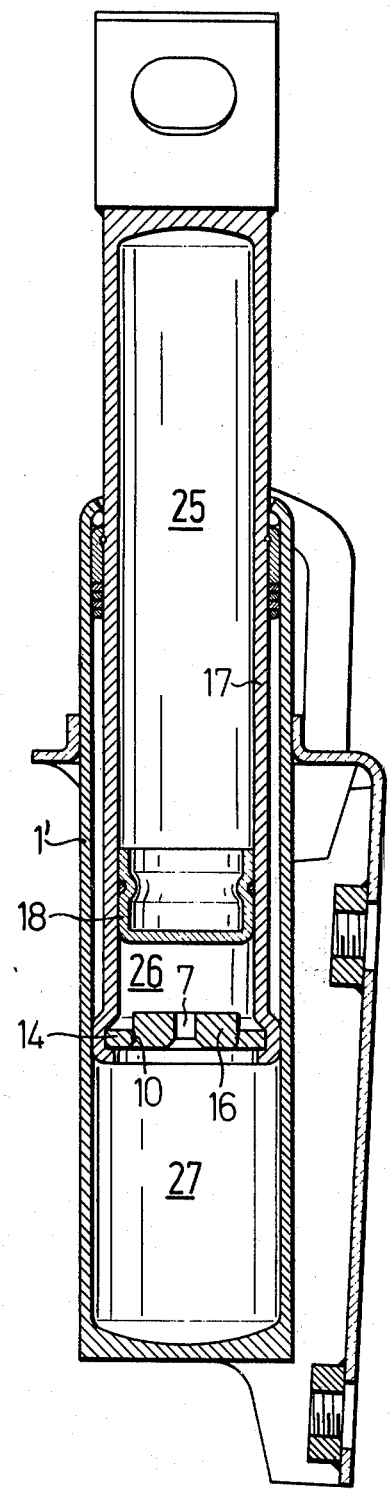
FIG. 4 shows yet another embodiment of the shock absorber in longitudinal section.

In the embodiment of FIG. 4, piston rod 17 is tubular, and a piston 18 within the tubular piston rod divides the interior thereof into two chambers. The upper chamber 25 within the piston rod is filled with a gas under pressure while a shock absorber liquid fills lower chamber 26. The inner end of piston rod 17 carries piston 16 which has central bore 7 in communication with chamber 27 of shock absorber cylinder 1 to assure flow of the shock absorber liquid between chambers 26 and 27.

The connection between piston rod 17 and piston 16 comprises annular flange 14 on the piston, the piston flange being received in an annular groove in the widened inner end of the piston rod. The axial length of connecting flange 14 is again so selected that the piston will break along line 10 when the impact force acting upon the piston exceeds a maximum limit. This will enable piston 16 to move freely within piston rod 17, and constricted bore 7 will no longer provide hydraulic damping of the impact force. In this stage, only the compressed gas in piston rod chamber 25 will now be effective to resist movement of piston rod 17 into shock absorber cylinder 1.

Figure 5:
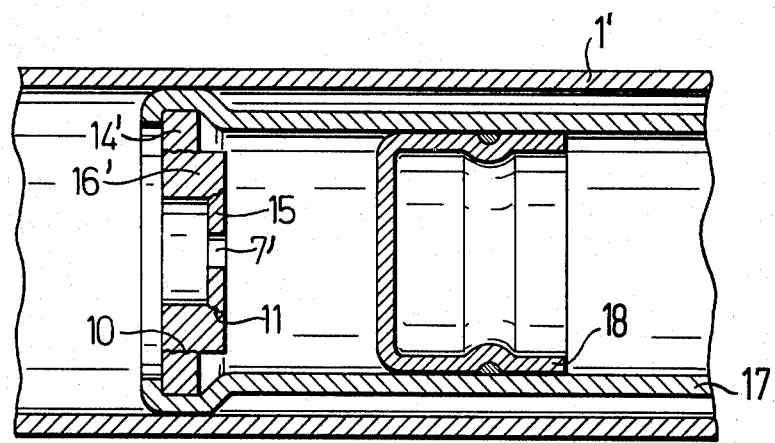
FIG. 5 is a view similar to that of FIGS. 2 and 3 but illustrating a modification of the embodiment of FIG. 4.

FIG. 5 shows a modification of the piston of FIG. 4, the shock absorber otherwise being identical to that of FIG. 4. Piston 16 is shown to comprise not only radially outwardly extending annular flange 14 but also a radially inwardly extending annular flange 15 which defines central bore 7. The axial length of flange 15 is relatively short and provides a second break line 11, in addition to break line 10, the piston breaking along line 11 because it breaks along line 10 before the axial length of flange 15 is less than that of flange 14. Thus, after the piston breaks along line 11, it will still define a central bore through which the hydraulic absorber fluid may flow to provide some effective absorption. Such a shock absorber, therefore, provides two-stage absorption, the absorptive force being first reduced when flange 15 breaks off when the impact exceeds a first maximum limit and the hydraulic absorptive force becoming ineffective in a second stage when flange 14 is detached under a higher impact.

It will be understood by those skilled in the art that the present invention is not limited to the illustrated structures. Thus, break lines in the pistons could be formed by any weakening in the structure of the piston, such as the formation of annular grooves in the piston. Similarly, it would be possible to make the connection of the piston rod to the car body or bumper breakable when the impact force exceeds a selected maximum. In the embodiment of FIG. 1, for instance, the riveted connection of the outer end of the piston rod at the bottom of guide tube 3 may be so constructed that it will break when a maximum force is exceeded. When the bottom breaks, the piston rod will simply extend into the chamber therebelow and the shock absorber will lose its effectiveness.

What is claimed is:
1. An impact shock absorber comprising:
   a. a cylinder part;
   b. a piston glidingly mounted in said cylinder part and held in a rest position under a yielding force;
   c. a piston rod part having an inner end in said cylinder part and extending outside said cylinder part;
   d. first connecting means for connecting one of said parts to a body element of a car;
   e. second connecting means for connecting the other part to a bumper element of said car, whereby the shock absorber may mount said bumper element on said body element for relative movement in respect thereto under an impact acting on said bumper element and causing the piston rod part to move in the cylinder part; and
   f. third connecting means connecting said inner end to a portion of said piston, said portion being weakened at the point of connection to break when said impact exceeds a predetermined maximum force, said yielding force resisting movement of said piston by said piston rod part under said impact.

2. The impact shock absorber of claim 1, wherein said piston defines a central bore of stepped configuration forming an inwardly extending radial flange on the piston said, inner end extending into the central bore and the flange constituting a weakened portion of the piston breaking off the piston under an impact exceeding said maximum force.

3. The impact shock absorber of claim 2, said third connecting means comprising a snap ring mounted in a circumferential groove in said inner end adjacent the piston flange, the snap ring forming a seat for the flange.

4. The impact shock absorber of claim 1, further comprising an outwardly extending radial flange on the piston in engagement with the piston rod, the flange breaking off the piston under an impact exceeding said maximum force.

5. The impact shock absorber of claim 4, further comprising an inwardly extending radial flange on the piston axially spaced from the outwardly extending flange, the inwardly extending flange being of smaller axial length than the outwardly extending flange and defining a central bore.

* * * * *